United States Patent [19]
Karuhn et al.

[11] 3,739,268
[45] June 12, 1973

[54] PARTICLE SENSING APPARATUS, METHOD AND FLOW DIRECTION COLLAR THEREFOR

[75] Inventors: Richard F. Karuhn, Chicago; Reg Davies, Justice, both of Ill.; Brian Howard Kaye, Sudbury, Ontario, Canada

[73] Assignee: IIT Research Institute, Chicago, Ill.

[22] Filed: Aug. 20, 1971

[21] Appl. No.: 173,575

[52] U.S. Cl. .......................................... 324/71 CP
[51] Int. Cl. .......................................... G01n 27/00
[58] Field of Search ...................... 324/71 R, 71 CP

[56] References Cited
OTHER PUBLICATIONS
Spielman et al.; J. Colloid & Interface Sci.; v. 26, pp. 175-182(1968)

*Primary Examiner*—Alfred E. Smith
*Attorney*—William E. Anderson, Edwin M. Luedeka and James J. Hamill et al.

[57] ABSTRACT

A flow direction collar is positionable in an electrical zone sensing apparatus with an elongated bore therein disposed in substantial alignment with an aperture through which particles carried by a liquid pass while being electrically sensed. The collar is positioned immediately upstream of the aperture to cause a directional flow of the liquid along a path substantially parallel to a longitudinal axis for the aperture. The flow through the collar directs the particles to flow along paths substantially parallel to the aperture axis thereby reducing the turbulence about the particle created by abrupt changes in velocity. Preferably, the collar includes a housing for telescoping on the bottom of a detection tube.

11 Claims, 10 Drawing Figures

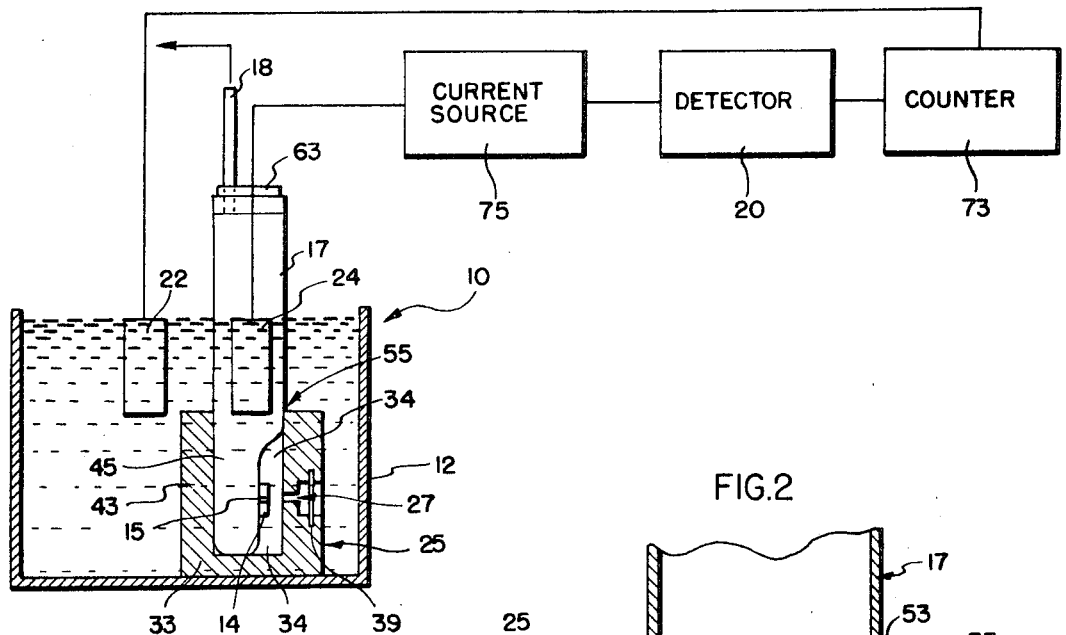
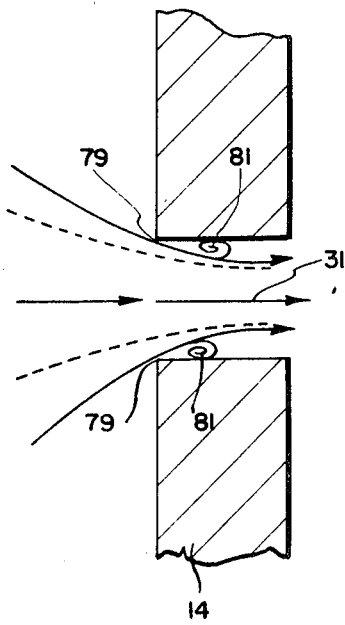
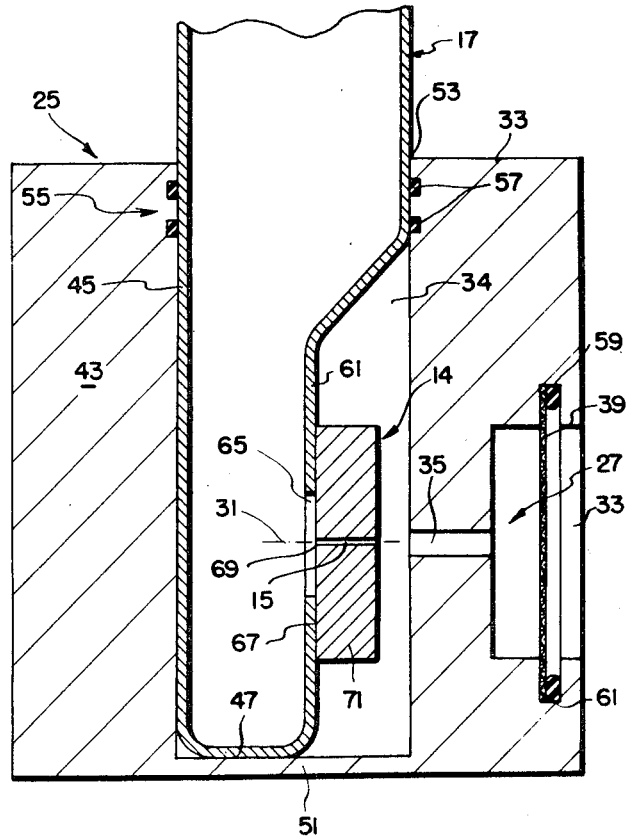

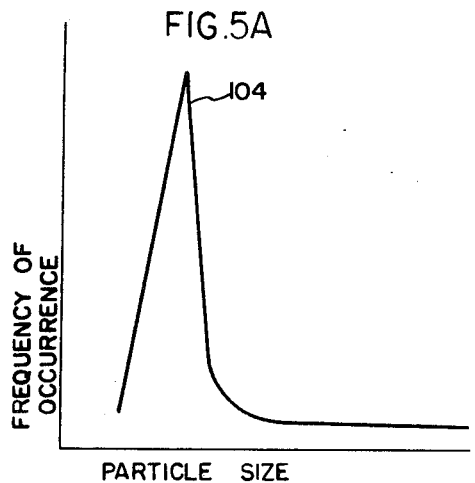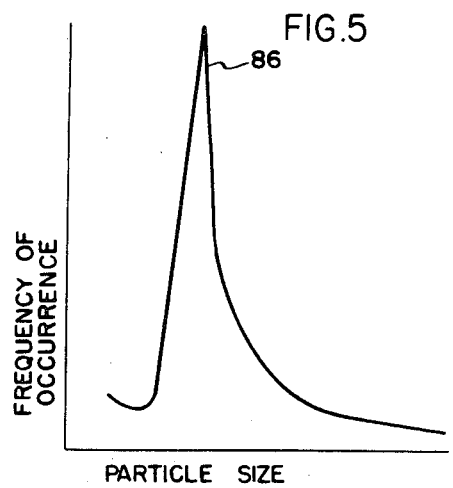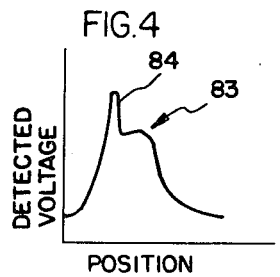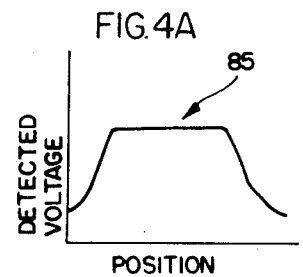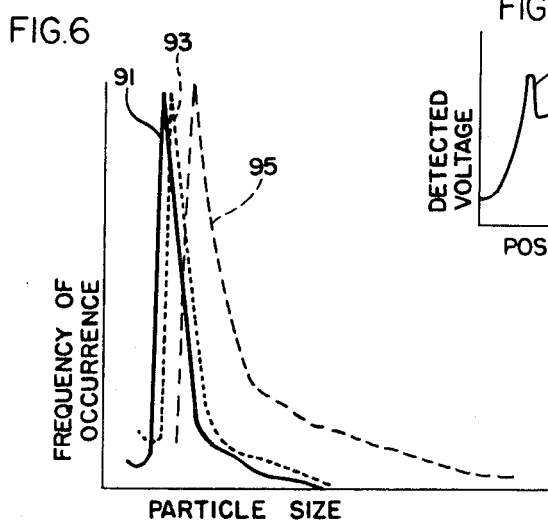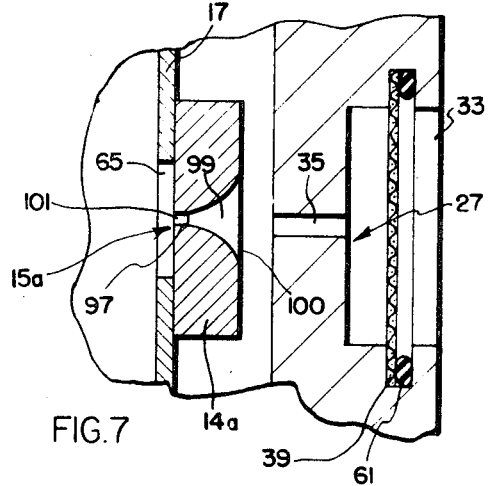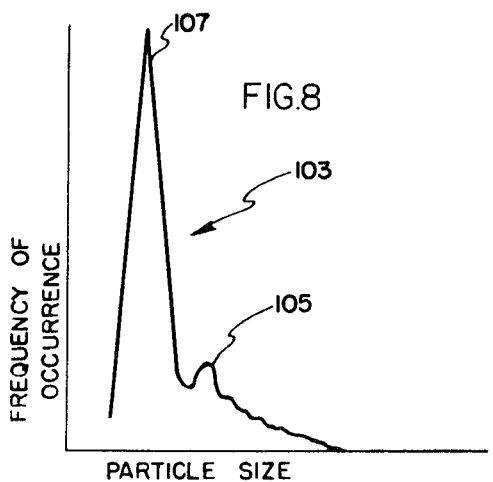

PARTICLE SENSING APPARATUS, METHOD AND FLOW DIRECTION COLLAR THEREFOR

This invention relates to detecting and sizing microscopic particles in a liquid medium with an electrical zone sensing apparatus and more particularly to a manner of controlling the flow of particles in fluid through a particle sensing zone of such an apparatus.

In copending application of Karuhn et al. filed of even date, entitled Method Of And Apparatus For Detecting And Sizing Microscopic Particles, and assigned to the assignee of this application, improved accuracy in sensing and sizing of microscopic particles was attained over that previously attained with a known kind of electrical zone sensing counter of the general type shown and described in U.S. Pat. No. 2,656,508. More specifically, it was found that particles flowing at an angle to the axis of the sensing zone aperture and about a sharp edge on the inlet side of the aperture were producing turbulence, also turbulent fluid flow was occurring, and that the particles were being detected as an electrical pulse which was the combined result of both the particles present and the turbulence. In some instances, the tiny voltages due to the turbulence actually gave the appearance of tiny particles within the electrolyte fluid.

As disclosed in the aforesaid copending application, improved accuracy of size measurement and size distribution may be obtained by providing flow control director means upstream of the aperture to provide a more streamline, less turbulent flow of electrolyte through the aperture and to guide the particles to flow along a path substantially parallel to the axis of the aperture. The flow control means illustrated in the aforesaid application is in the form of a smooth tapered flow director inlet wall blended with the aperture to remove the sharp edge effect at the prior art aperture and to provide laminar fluid flow properties through the aperture; and this also resulted in the electrical sensing means producing a regularly occurring pulse of more ideal shape. The flow director inlet wall in the aforesaid application was formed in a sapphire wafer in which the aperture was also formed and the two were smoothly blended at a transition zone therebetween. The aperture was generally cylindrical in shape.

To substitute the new wafer disclosed in the aforesaid application for the conventional wafer already in existing equipment, is not always easy as these wafers are often fused to a glass receiving tube. Thus, it may be difficult for some persons to modify their existing equipment to achieve the improved resolution. Therefore, a need exists for an inexpensive flow straightener means which can be readily used with existing counters of the kind described.

Accordingly, a general object of the present invention is to provide a simple and inexpensive device for improving the accuracy of an electrical zone sensing apparatus.

These and other objects of the invention will become apparent with reference to the following detailed description and accompanying drawings, in which:

FIG. 1 is a schematic representation of an apparatus for detecting and sizing microscopic particles;

FIG. 2 is an enlarged, sectional, elevational view of a portion of the apparatus shown in FIG. 1;

FIG. 3 is a diagrammatic view of the scanner portion of a prior art device;

FIG. 4 is a graphical representation of an abnormal pulse shape for a single particle detected with the prior art device of FIG. 3;

FIG. 4A is a more ideal pulse shape detected for a single particle when using the apparatus of FIG. 1;

FIG. 5 is a graphical representation of particle frequency distribution obtained with a prior art device;

FIG. 5A is a graphical representation of particle frequency distribution obtained with the present invention;

FIG. 6 is a graphical representation of particle frequency distribution obtained with the apparatus shown in FIG. 1 with the particles entering at varying angles to the orifice axis;

FIG. 7 is a fragmentary, enlarged, sectional view of another apparatus for detecting and sizing microscopic particles; and FIG. 8 is a graphical representation of the effect of particles detected using the apparatus shown in part in FIG. 7.

As shown in the drawings for purposes of illustration, the invention is embodied in an apparatus 10 for detecting and measuring the size and the frequency of distribution of microscopic particles suspended in a fluid medium such as a liquid electrolyte. Very generally, the illustrated apparatus 10 comprises a vessel 12 such as a beaker containing the electrolyte and the suspended particles which are to be analyzed. The electrolyte containing the particles in the vessel is drawn through a small aperture 15 in a scanner element 14 into a receiver tube 17. The liquid flow through the scanner element 14 is caused by a fluid head, i.e. a pressure differential, such as by applying reduced pressure from a vacuum line 18 to the upper surface of the liquid in the tube. To measure the change in conductivity caused by a particle passing through the aperture 15 in the scanner element, there is provided an electrical circuit means including a detector circuit 20 which is connected to an electrode 22 projecting into the electrolyte in a vessel and an electrode 24 projecting into the electrolyte in the tube.

In accordance with the present invention, improved accuracy in size measurement and size distribution has been obtained by addition of a simple and inexpensive flow straightener means in the form of a flow direction collar 25 to a conventional electrical zone sensing apparatus. More specifically, the flow direction collar is positioned with an elongated bore 27 therein disposed in substantial alignment with the axis of the aperture 15 to cause a directional flow thereby reducing particle induced turbulence in the electrolyte flowing from the vessel 12 into the detection tube 17 that is obtained without the flow direction collar 25. The flow direction collar also serves to direct the particles to flow along paths substantially parallel to an axis 31 through the circular aperture 15 in the scanner element 14. To facilitate positioning of the flow directing bore 27 in alignment with the aperture 15, the illustrated flow directing collar has a housing 33 with a cylindrical chamber 34 for telescoping on the bottom of the detection tube 17. In this instance, the flow directing bore 27 comprises a large outer diameter section 33 and an inner restricted diameter section 35.

Also, in accordance with this invention, improved results may be obtained by providing a micro-mesh screen 39 for filtering particles or debris from the liquid flowing through the bore 27 which would be too large to pass readily through the aperture 15. By filtering the large particles and debris from the electrolyte, turbulence which results if a particle is lodged at the entrance to the aperture 15 is avoided.

Referring now in greater detail to the flow direction collar 25, its housing 33 is generally cylindrical with a cylindrical wall 43 telescoped about a lower end 45 of the detection tube 17 with a bottom wall 47 of the tube abutting inner side 49 of a bottom wall 51 for the housing 33. Preferably, the housing 33 is formed of a plastic such as high density polyethylene and is molded with the cylindrically shaped chamber 34 defined within the cylindrical wall 43.

To prevent the flow of electrolyte an particles into cylindrical chamber 34 through a top opening 53 in the housing 33, a sealing means 55 is provided. The illustrated sealing means is in the form of a pair of O rings 57 which are seated in annular grooves in the cylindrical wall 43 adjacent the top of the housing. Thus, the flow of electrolyte from the vessel into the interior chamber of the housing 33 must be by way of passage through the screen 39 and the flow directing bore 27.

Referring now in greater detail to the micro-mesh screen 39, it is positioned at the entrance to the outer large diameter section 35 of the flow directing bore 27 in an enlarged annular seat 59 into which is also positioned an O ring 61 to tightly secure the screen within the seat to prevent particles passing around the screen. Preferably, the screen is substantially larger in diameter than the diameter of the restricted section 35 to assure that no turbulence in the fluid flow is due to the screen.

The illustrated screen 39 is a micro-mesh screen having openings less than or equal to orifice size in larger dimension so that most of the particles being sized can readily pass through the screen with the electrolyte. The function of the screen is to prevent the movement of large particles to the aperture 15 as would lodge at the entrance to the aperture and create turbulent flow.

Referring now in greater detail to the illustrated apparatus, the vessel 12 comprises a beaker or other receptacle of insulating material, such as glass, which is adapted to contain an electrically conductive liquid in which the particles to be detected and measured are scattered and suspended. In the examples given herein, the electrically conductive liquid or electrolyte is sodium chloride in which are latex particles of about 2.68 microns in diameter are suspended, although other suitable electrolytes can be used. The particles are scattered in the electrolyte so that groups of particles do not influence electrical sensing by the detector 20. The liquid and the particles are of different conductivity usually in magnitude of several different orders so that current or voltage change can be measured by the detector 20 as a function of change in conductivity. The detection tube 17 for receiving the fluid is also of insulating material, such as glass, and the tube rests within the vessel. In this instance, a lower side wall of the tube 17 is flattened to provide a flat wall 61, as best seen in FIG. 2, at its lower end and a stopper 63 (FIG. 1) closes the upper end of the tube. In the flattened wall 61, an opening 65 is formed and spaced from the bottom of the tube. Preferably, the seal rings 57 engage the detection tube 17 at a circular cross section immediately above the flattened wall 61 and prevent liquid flow therepast into the chamber 34.

The scanner element 14 is mounted such as by a suitable adhesive or fusion technique to the flat wall 61 with its aperture 15 in register with a central portion of the larger diameter opening 65 in the detecting tube 17. A rear side 67 of the scanner element covers the opening except at an outlet end 69 of the aperture 15. Thus, a path of fluid flow is defined from the vessel 12, through flow direction collar 25, aperture 15 and the tube wall opening 65 into the detection tube 17. As a difference in fluid head is established between the vessel and the tube, preferably by drawing through the pipe 18 a vacuum on the surface of the liquid in the tube, the liquid and particles are induced to flow between the vessel and tube.

In the illustrated embodiment, the scanner element 14 comprises a small block or wafer 71 of sapphire or another inert element. The wafer may be fused to the flattened wall 61 of the tube wall, the tube preferably being fabricated of a heat-resistant glass to receive the fused sapphire wafer without damage. The cylindrical aperture 15 may be formed by drilling or by other known methods. The aperture 15 is typically between about 30 to 560 microns in diameter, and the length of the aperture is about equal to the dimension of the aperture diameter.

The detector 20 electrically senses, measures, and amplifies signals produced by changes in resistance in the aperture 15 due to particles passing therethrough. It is operatively connected to the electrode 22 disposed in the vessel 12 and to the electrode 24 located in the tube 17, both electrodes being immersed in the electrolyte. The detector 20 is further operatively connected to a counter 73 which totals the number of signals. A current source 75 operates the detector 20 and the counter 73. A cathode ray oscilloscope (not shown) can be utilized to visually display the shape of the current or voltage pulses which have been detected. Circuitry for the detection and measurement of particle signals is well known and any suitable system can be employed.

As each particle passes through the aperture 15, it displaces its own volume of the electrically conductive liquid within the aperture. As the liquid and particles are of different conductivity and resistance, and displacement of one by the other results in a momentary change in the detected resistance between the electrodes 22 and 24 on either side of the aperture. This resistance change produces a voltage pulse of short duration having a magnitude proportional to particle volume, if the current is kept constant. It should be noted that the method may also comprise maintaining the voltage constant while detecting a change in measured current. Accordingly, voltage pulse height is proportional to amplifier gain, aperture current and the resistance change indicated upon passage of a particle through the aperture.

Thus, $$\Delta E = GI \Delta R,$$

where
$\Delta E$ = voltage pulse height
$G$ = amplifier gain
$I$ = aperture current
$\Delta R$ = change in resistance,
and $$\Delta R = \rho_o V/A^2 \ [1/(1-\rho_o/\rho) - a/A]^{-1}$$

where
$\rho_o$ = electrolyte resistivity $V$ = particle volume (the particle being a right cylinder having its axis aligned with and shorter than the aperture axis)
$A$ = area of the aperture normal to its axis
$\rho$ = effective particle resistivity
$a$ = area of the particle taken normal to the aperture axis as oriented in the aperture It can be seen that, theoretically, response to passage of a particle through the aperture 15 is substantially linear with particle size, provided that the particle has less than about 40 percent of the diameter of the aperture. To ensure that the change in current or voltage induced by the passage of the particles through the aperture is dependent substantially on particle size, the fluid medium is chosen so that particle resistivity is effectively several orders of magnitude greater than liquid resistivity.

It has been found that electrical charge, surface films, porosity of the particles and temperature of the liquid have little effect on response or can be readily compensated for. Also, the particle shape and internal structure do not greatly affect size measurement.

Disturbances frequently occur which result in a voltage change larger than expected for a particle of a given size. These disturbances increase the standard deviation of the particle size distribution, when compared with that determined by an electron microscope. Generally, such disturbances are observed when particles do not pass through the cylindrical aperture 15 parallel to its axis and accordingly create areas of turbulence about the particles. If the particles enter the scanner element 14 at an angle to the aperture axis 31, interaction occurs between a sharp edge 79, as best seen in FIG. 3, of the scanner element in which the aperture is formed, the particle, and the liquid, which interaction produces turbulence about the particle usually because of an abrupt increase in the velocity of the particle. Also, a vortex area 81 is created just inside the entrance to the cylindrical aperture by the electrolyte liquid flowing past the sharp edge and separating into streams and a turbulence results in this region producing the disturbances or noise or false signals. Such liquid turbulence can be reduced by eliminating the sharp edge and providing a smooth contoured surface at the aperture inlet as described in the aforesaid copending application. When the pulse produced by the particle induced turbulence is added to the voltage pulse produced by the particle, a pulse much larger and of a different shape than the theoretical pulse shape results. The turbulence pulses might also be counted as additional small particles. On the other hand, particles entering the aperture 15 parallel to the axis thereof produce a pulse height and shape similar to the theoretical height and shape. Accordingly, elimination of this turbulence pulse permits more accurate reading and lowering the threshold of size detection.

A commercially available electrical zone sensing apparatus generally similar to that disclosed in FIG. 1 but without the flow directing collar 25 and having the scanner element 14 shown in FIG. 3 will be described as to the pulse shapes and frequency distribution curves obtained therewith. As best seen in FIG. 3, the fluid medium passes in the direction shown by the arrow through the aperture 15 in the scanner element 14, the entrance to which is defined by the sharp edge 79. The turbulence caused by the particle and electrolyte flow past the sharp edge is indicated in the pulse 83 (FIG. 4), which is a graph of detected current versus position of the particle within the aperture. More particularly, the pulse 83 includes a small peak 84 which adds to the overall height of the pulse making it of greater height than a similar but more ideal pulse shape 85 obtained when using the flow straightening means of the present invention.

Many of the particles passing through the aperture 15 of the scanner element 14 of the prior art device along paths parallel to the aperture axis produce a normal pulse but it is the frequency of the abnormal pulse shapes due to the turbulence which results in a lack of accuracy in measurement which will be described in connection with the graphs shown in FIGS. 5 and 8. The peaked particle distribution curve shown in FIG. 5 obtained with the scanner element 14 of FIG. 3 without the flow straightening means is wider at its base and is wider at the top of the peak 86 than is the peaked curve 88 shown in FIG. 5A obtained with the flow directing collar 25. The curve of FIG. 5A is a more accurate representation of particle size frequency than is the curve of FIG. 5 as the particles detected have been previously sized by other apparatus. Providing the flow direction collar 25 thus results in substantially axial flow of the fluid and particle thereby reducing turbulence about the particles which results from an abrupt change in velocity when its direction is changed to axial, and accordingly negation of noise, even if a particle initially enters the collar along a line other than substantially parallel to the aperture axis 31.

If the flow direction collar is properly positioned such that its bore 27 and the aperture 15 are in register, substantially non-turbulent particle flow will occur and good resolution of size distribution will be achieved, as illustrated by the solid line curve 91 in FIG. 6. On the other hand, if the collar is improperly positioned or deliberately mispositioned and the particles are directed into the aperture 17 at an angle of about 5° to the aperture axis, the mean particle size will appear to increase and good resolution of size distribution will not be attained. Dotted line curve 93 in FIG. 6 illustrates the results achieved when the flow direction collar 25 was turned 5° from a position in which its flowing directing bore 27 was substantially aligned with the axis 31 of the aperture 15 and hence in this position the particles flowing through the bore 27 are deliberately guided along a path at a 5° angle to the aperture axis 31. The mean particle increase is due to noise created by the particles not following a path aligned with the aperture axis. By turning the collar 25 to a position in which its bore axis was 50° from the axis 31, particles were directed along a path at an angle of about 50° to the aperture axis; and the mean particle size increased to an even greater extent and the size distribution was grossly inaccurate as indicated by the dotted line curve 95 shown in FIG. 6. Thus, the value of flow straightening in achieving greater accuracy in size measurement and the achieving of an extension of particle size range was demonstrated.

A further embodiment of the invention is illustrated in FIG. 7. In this embodiment, the scanner element 14 of the conventional kind has been replaced with a scanner element 14a of the kind disclosed in the aforesaid copending application to reduce the electrolyte turbulence caused by the liquid flowing about the sharp edge of the aperture. The scanner element 14a has a short cylindrical aperture 15a defined by a cylindrical wall 97 and a contoured, smoothly-curved, inlet wall 99 converging from a large diameter inlet opening 100 to a smooth blended intersection 101 with the aperture defining wall 97. This eliminates the sharp, leading edge effect of the entrance edge 79, FIG. 3, and causes a more uniform particle approach to the aperture 15a thereby eliminating edge effects which results in turbulence and noise. The combination of the flow direction collar 25 and flow directing wall 99 has been found to substantially reduce both fluid turbulence and particle turbulence, more specifically, fluid flowing through the bore 27 in the collar 25 is straightened to flow parallel to the axis 35 of the aperture prior to its passage into the curved smooth wall 99 and the particles do not experience turbulence by flowing past the sharp edge of the apertures of the prior art.

The contoured wall 99 preferably has a maximum diameter at its inlet opening 100 equal to about five times the aperture diameter and the contoured wall flares inwardly and smoothly into the aperture. The contoured wall preferably has a length about twice the length of the aperture and its axis is aligned with the axis of the bore 27 and the aperture axis 35. The length of the flow directing bore 27 is preferably at least about one one-half times the diameter of the bore and the bore 27 is preferably substantially larger in diameter than the diameter of the aperture 15a.

When the electrical zone sensing apparatus is provided with both the flow straightening collar 25 and the contoured orifice wall 99, the best results are obtained from the standpoints of more uniform and ideal particle wave shapes, such as the wave shape shown in FIG. 4a and of finer resolution of particle distribution curves such as illustrated in FIG. 8 by the curve 103. The better resolution of particle size versus frequency of occurrence can be best understood in connection with a comparison of the curves shown in FIGS. 5, 5a and 8. It will be recalled that the curve 86 shown in FIG. 5 was obtained without the flow direction collar 25 and without the contoured orifice while curve 104 shown in FIG. 5a was obtained when using the flow direction collar 25 without the contoured orifice. The curve 103 shown in FIG. 8 not only has a narrow base like that of the curve 104 of FIG. 5a as a result of using the flow direction collar 25 but also includes a secondary peak 107. This secondary peak was known to be statistically valid for the sample being tested and it was verified by testing the samples in other manners. The secondary peak 105 was not in evidence, however when using a prior art aperture shown in FIG. 3 with the conventional electrical zone sensing apparatus. Thus, the improved accuracy of resolution illustrated by the curve 103 shown in FIG. 8 is thought to be the product of elimination of both particle turbulence caused by the sharp edge effect at the inlet side of the aperture and fluid turbulence caused by non-laminar non-directed fluid flow into the aperture.

The term flow straightening means has been used herein as a generic term to refer to devices such as the illustrated simple flow directing collar device which is secured to the detection tube 17 to provide the flow directional characteristics desired. The flow direction collar may, of course, be positioned in other manners than be telescoping on the bottom of the detection tube to align the axis of its bore with the axis of the aperture. Also, it is within the purview of the invention that the flow straightening means be formed in devices which would not normally be considered or termed a "collar" but which have a flow control bore or means.

From the foregoing, it will be seen that the present invention provides an improved method and apparatus for detecting and sizing microscopic particles. The flow directing collar may be readily installed on existing electrical zone sensing apparatus to reduce turbulence and to direct the particles to flow along a path substantially aligned with the axis of the aperture in the scanner element of the apparatus. This results in greater accuracy and an extension of the particle size range which can be measured.

While several embodiments of the invention have been shown and described, it should be apparent that various modifications could be made therein without departing from the scope of the invention.

Various of the features of the invention are set forth in the following claims.

What is claimed is:

1. In an apparatus for electrically sensing and sizing microscopic particles suspended in a fluid medium, the combination comprising means for containing the fluid medium and suspended particles to be sensed and sized, receiving means for receiving the fluid medium and particles subsequent to the sensing and sizing thereof, means defining an aperture interconnecting in fluid communication said containing means and said receiving means and through which said particles pass to be sensed and sized in the course of travel from said containing means to said receiving means, a flow straightening means associated with said receiving means and positioned at an inlet end for said aperture and having a bore substantially aligned with the axis of said aperture for directing the fluid medium and particles to flow in a direction substantially parallel to said axis means for electrically sensing the flow directed particles passing through said aperture and for taking size measurements of the particles, and means for securing said flow straightening means with said receiving means to cause all of the fluid medium to travel through said bore in said fluid straightening means before traveling through said aperture.

2. An apparatus in accordance with claim 1 further comprising a screen mounted in said bore for filtering particles which are too large to pass through said aperture.

3. An apparatus in accordance with claim 1 in which said bore of said flow straightening means is relatively elongated and has a diameter of at least about one one-half times the diameter of said aperture.

4. An apparatus in accordance with claim 1 in which said flow straightening means comprises a flow direction collar having a housing with a hollow chamber therein with an open top and in which said receiving means comprises a detection tube telescoped through said open top into said hollow chamber of said housing.

5. An apparatus in accordance with claim 1 in which said receiving means comprises a generally cylindrical tube, said flow straightening means is an attachment secured to said receiving means.

6. In an apparatus for electrically sensing and sizing microscopic particles suspended in a fluid medium, the combination comprising means for containing the fluid medium and suspended particles to be sensed and sized, receiving means for receiving the fluid medium and particles subsequent to the sensing and sizing thereof, means defining an aperture interconnecting in fluid communication said containing means and said receiving means and through which said particles pass to be sensed and sized in the course of travel from said containing means to said receiving means, a flow straightening means associated with said receiving means and positioned at an inlet end for said aperture and having a bore substantially aligned with the axis of said aperture for directing the fluid medium and particles to flow in a direction substantially parallel to said axis, means for electrically sensing the flow directed particles passing through said aperture and for taking size measurements of the particles, said flow straightening means comprising a flow direction collar having a housing with a hollow chamber therein with an open top, said receiving means comprising a detection tube telescoped through said open top into said hollow chamber of said housing, said flow directing bore comprising an inner cylindrical section formed in said housing of a diameter smaller than the diameter for a large outer cylindrical section formed in said housing.

7. An apparatus in accordance with claim 6 in which a filter is disposed at said outer section to filter large particles and debris from the fluid medium flowing through said inner cylindrical section.

8. A flow direction collar for attachment to a detection tube of an electrical zone sensing apparatus having an aperture through which fluid and particles may pass to be sized or counted, said collar comprising, means for securing said collar to said detection tube, and means defining an elongated flow-directing bore on said collar for substantial alignment with a central axis for said aperture to cause fluid to be directed to flow in a direction parallel to said axis and to cause said particles to flow along paths substantially aligned with the axis of said aperture.

9. A flow direction collar for attachment to a detection tube of an electrical zone sensing apparatus having an aperture through which fluid an particles may pass to be sized or counted, said collar comprising, means for securing said collar to said detection tube, and means defining an elongated flow-directing bore on said collar for substantial alignment with a central axis for said aperture to cause fluid to be directed to flow in a direction parallel to said axis and to cause said particles to flow along paths substantially aligned with the axis of said aperture, said means for attachment to said detection tube comprising a housing having a opening therein to telescopingly receive a lower end of said detection tube, said flow directing bore also being formed in a side wall of said housing.

10. A method for electrical sensing and determining the size of small particles suspended in liquid within a large vessel by passage through a flow straightening means and through an aperture having a longitudinal axis into a receiving means, said method comprising the steps of:

suspending the particles throughout the liquid carrying the particles through said aperture, inducing the liquid upstream of said aperture to pass through an elongated bore in a flow directing means, directing particles flowing with the fluid in said elongated bore to flow along streamline paths substantially parallel with the axis of said aperture, inducing fluid leaving said elongated bore to flow through the aperture and to carry the suspended particles through said aperture along paths substantially parallel to the axis of the aperture and into said receiving means, and electrically sensing and measuring the size characteristics of the particles passing through said aperture.

11. A method in accordance with claim 10 including a further step of filtering debris and particles from said liquid prior to movement through said flow directing collar.

* * * * *

UNITED STATES PATENT OFFICE
CERTIFICATE OF CORRECTION

Patent No. 3,739,268          Dated June 12, 1973

Inventor(s) Richard F. Karuhn, Reg Davies and Brian H. Kaye

It is certified that error appears in the above-identified patent and that said Letters Patent are hereby corrected as shown below:

Column 3, line 14, "an" should be --and--.

Column 7, line 64, "be" should be --by--.

Claim 1, column 8, line 36, a comma (,) should be inserted after "axis".

Signed and sealed this 27th day of November 1973.

(SEAL)
Attest:

EDWARD M. FLETCHER, JR.
Attesting Officer

RENE D. TEGTMEYER
Acting Commissioner of Patents